No. 821,732. PATENTED MAY 29, 1906.
C. H. OLSBY.
ARTIFICIAL FISH BAIT.
APPLICATION FILED JULY 20, 1905.

UNITED STATES PATENT OFFICE.

CARL H. OLSBY, OF VALLEY CITY, NORTH DAKOTA.

ARTIFICIAL FISH-BAIT.

No. 821,732.  Specification of Letters Patent.  Patented May 29, 1906.

Application filed July 20, 1905. Serial No. 270,498.

*To all whom it may concern:*

Be it known that I, CARL H. OLSBY, a citizen of the United States, residing at Valley City, in the county of Barnes and State of North Dakota, have invented certain new and useful Improvements in Artificial Fish-Bait; and I do hereby declare the following to be a full, clear, and exact description of the invention, such as will enable others skilled in the art to which it appertains to make and use the same.

My invention relates to artificial fish-bait, and has for its special object to provide a cheap and durable bait which when applied to a hook will have the appearance of an angle-worm thus applied.

To the above ends the invention consists of the novel construction and arrangement of parts hereinafter described, and defined in the claims.

The improved bait is illustrated in the accompanying drawings, wherein like characters indicate like parts throughout both views.

Figure 1:
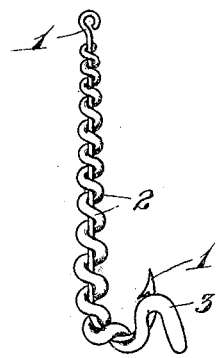
Figure 2:
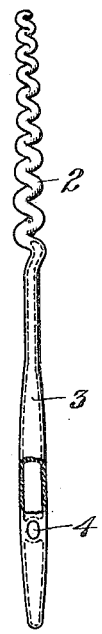

Figure 1 is a view in side elevation, showing the improved bait applied to a hook; and Fig. 2 is a side elevation showing the improved bait removed from a hook, parts thereof being broken away.

Referring to the drawings, the numeral 1 indicates an ordinary fishhook.

The improved bait is advisably constructed of rubber and as preferably constructed is made up of two integrally-united sections 2 and 3, the part 2 being spiral and nearly solid, the part 3 being formed hollow and pliable. The said spiral part 2 should be cast or otherwise formed in such manner that it will tend to maintain a spiral form—that is, will be self-sustaining in spiral form. The pliable section 3 should have such thin walls that it may be readily wrapped about the hook and if bit upon by the fish will appear to be soft, or, in other words, to have a body similar to that of an angle-worm. Furthermore, the rubber from which the bait is constructed should be given a gray color in imitation of the color of an angle-worm. At a point considerably above the extreme lower end of the bait there is preferably formed an eye 4, transversely through and through, which the pronged point of the hook is adapted to be passed without puncturing the bait and without letting out the air contained within the air-cavity of the pliable section 3 of the bait.

When the bait is applied to the hook, it will attain approximately to the form illustrated in Fig. 1, and, as is evident, it cannot be pulled from the hook, but is nevertheless capable of yielding when bent upon and pulled by the fish. It will therefore have many of the characteristics of an angle-worm and will of course last a long time.

The bait is of small cost and efficient for the purposes had in view and saves a great deal of time and objectionable work to keep the hook baited, which is always required with real angle-worms.

What I claim, and desire to secure by Letters Patent of the United States, is as follows:

1. An artificial bait constructed of rubber or similar material made in imitation of an angle-worm, and having a permanently-coiled section and a pliable section, substantially as described.

2. An artificial bait made in imitation of an angle-worm having a pliable lower end section formed near its extremity with an eye.

3. An artificial bait constructed of rubber or similar pliable material made in imitation of an angle-worm and formed with a permanently-coiled section 2 and with a hollow pliable section 3, substantially as described.

4. An artificial bait constructed of rubber or similar material made in imitation of an angle-worm and formed with a permanently-coiled portion 2, and a pliable hollow portion 3, said portion 3 having near its extremity an eye 4, substantially as described.

In testimony whereof I affix my signature in presence of two witnesses.

CARL H. OLSBY.

Witnesses:
 B. J. LAD,
 H. A. OLSBERG.